(12) United States Patent
Treiber et al.

(10) Patent No.: US 6,359,676 B1
(45) Date of Patent: Mar. 19, 2002

(54) METHOD AND APPARATUS FOR PRINTING PHOTOGRAPHS FROM DEVELOPED FILM ONTO LIGHT-SENSITIVE PHOTOPRINT MATERIAL

(75) Inventors: Helmut Treiber; Friedrich Jacob, both of Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/710,938

(22) Filed: Nov. 13, 2000

Related U.S. Application Data

(63) Continuation of application No. 09/112,521, filed on Jul. 9, 1998, now abandoned.

(30) Foreign Application Priority Data

Aug. 1, 1997 (DE) .......................................... 197 33 370

(51) Int. Cl.⁷ ........................ G03B 27/44; G03B 27/80; G03B 27/68; G03B 27/52
(52) U.S. Cl. ............................. 355/46; 355/20; 355/52; 355/64
(58) Field of Search .............................. 355/18, 20, 39, 355/40, 43, 46, 52, 64, 66, 67, 69, 70; 358/302; 352/55, 90

(56) References Cited

U.S. PATENT DOCUMENTS

| | | | | |
|---|---|---|---|---|
| 1,980,981 A | * | 11/1934 | Cooke | 156/58 |
| 3,673,932 A | * | 7/1972 | Rottmiller | 396/332 |
| 4,436,392 A | * | 3/1984 | Vanderwerf | 353/38 |
| 4,786,944 A | * | 11/1988 | Sakamoto et al. | 355/20 |
| 5,293,226 A | * | 3/1994 | Yamamoto et al. | 348/780 |
| 5,302,983 A | * | 4/1994 | Sato et al. | 353/69 |
| 5,319,744 A | * | 6/1994 | Kelly et al. | 395/136 |
| 5,432,580 A | * | 7/1995 | Tokuda | 351/298 |
| 5,745,252 A | * | 4/1998 | Rauh et al. | 358/302 |

\* cited by examiner

Primary Examiner—Russell Adams
Assistant Examiner—Rodney Fuller
(74) Attorney, Agent, or Firm—Milde & Hoffberg, LLP

(57) ABSTRACT

Apparatus for imaging photographic negatives onto light-sensitive photoprint material includes a platform (3) for the print material; a digital image projection system (2) with an electronic image generation unit; and an integrated analog image projection system (1) with an light source and a negative holder. The image generator of the digital image projection system is disposed outside the light ray path of the analog image projection system. The projection systems are so constructed and arranged that the photoprint material on the platform (3) can receive images from both projection systems simultaneously or consecutively. When a change is made for the projection of images by one projection system to the other, the two light ray paths remain unchanged.

21 Claims, 3 Drawing Sheets

METHOD AND APPARATUS FOR PRINTING PHOTOGRAPHS FROM DEVELOPED FILM ONTO LIGHT-SENSITIVE PHOTOPRINT MATERIAL

This application is a continuation of 09/112,521, filed Jul. 9, 1998 now abandoned.

BACKGROUND OF THE INVENTION

The present invention relates to a method and apparatus for imaging photographic negatives onto light-sensitive photoprint material. More particularly, the invention relates to both a conventional analog projection system for photographic negatives and a digital image projection system for index prints and other electronically generated images.

A device for producing prints from photographic negatives and for imaging index prints is disclosed in the European Patent Publication No. OS 0,308,967. In this case, a series of photographic images is projected onto photosensitive printing material. After printing the last image of the series, a mirror is mechanically pivoted into the light ray path of the integrated printing unit, and an index print is projected onto the same strip of photosensitive material. The index print is generated by a cathode ray tube (CRT). Additionally, the German Patent Application No. 196 23 835 discloses a photographic printing device wherein, after printing a series of photographic images, a light transmissive display unit, such as a liquid crystal display (LCD), is inserted into the printing light ray path. By means of this display unit, an index print is projected onto the light-sensitive photoprint material. In this case, the same light source is used for the index prints as for printing the series of images.

Switching over from one type of projection to the other requires much time in these known devices, so that printing output is slow. Additionally, adjustment of the folding mirror and of the LCD transmissive display unit is very expensive and requires costly pivoting mechanisms.

The photographic printer disclosed in the German Patent Publication No. 4,418,601 has two printing stations. These project regular prints and index prints onto the same strip of print material, acting consecutively and in offset fashion. The disadvantage of this arrangement is that two support platforms are necessary for the photoprint material. Also, the illumination areas onto which the regular prints and index prints are projected must be adjusted very exactly with respect to each other. A quite expensive additional procedure is required for this, in which the length of the photoprint material is monitored and controlled.

SUMMARY OF THE INVENTION

Therefore, a principal object of the present invention is to develop an appropriate method and device for imaging of photographic negatives onto light-sensitive photoprint material which makes possible the simple and reliable imaging of both analog and digital images onto this photoprint material. Printing speed is to be improved by a fast change-over between a digital image and an analog negative image projection.

This object, as well as other objects which will become apparent from the discussion that follows, are achieved, according to the present invention, by providing both a digital and an integrated (negative) image projection system, respectively, for which the light ray path of the integrated projection system is not influenced or changed in any way when the generated digital image is projected. This condition is satisfied and ensured by having the electronic image generator of the digital projection system disposed outside the light ray path of the integrated image projection system. The digital projection system is so designed and constructed that it projects the digital images onto the photoprint material on the same platform as does the integrated image projection system. In this way, a switch can be made between digital and integrated (negative) images without having to move mechanical components.

Thus, for example, in a photographic printing device, immediately after projection of a series of photographic images onto the light-sensitive photoprint material, the electronically generated images for the index prints can be projected onto the same printing paper platform. Such an arrangement also offers the option of projecting electronically generated image data, such as lines of type, directly and simultaneously with the analog images onto the photoprint material. A further option is to scan in the analog pictures, and then modify the electronic image data. Thus, for example, it is possible to electronically mask the scanned in images and then project them onto the photoprint material via the digital protection system. Alternatively or in addition, it is possible to electronically change the contrast or coloration of the images. With modification of the digital data, many other types of changes are possible.

According to the invention, the digital image can be formed by means of a light modulator that can be driven by a control device in a pixel mode. The light modulator can be either reflecting or transmissive. DMDs (digital micromirror devices as are described, for example, in the European Patent Publication No. OS 0,738,910), LCDs (liquid crystal displays), FLCDs (ferroelectric liquid crystal displays) or PLZTs (piezo-electric lithium, zirconium titanate displays), as well as any other pixel-controllable light modulators, can be used. DMDs are particularly advantageous, because they are very bright and can be switched very quickly. This reduces the required illumination time and thus makes possible rapid printing. Owing to the small light loss when DMDs are used, LEDs can be used for the illumination (light source). These have the advantage that, like DMDs, they can be switched rapidly. They can be quickly switched off between illuminations to avoid an incidence of stray light. No additional sealing apparatus is therefore required as must be used with light sources that switch more slowly. Additionally, their long service life makes LEDs particularly advantageous light sources.

If, in contrast, transmissive light modulators are used, then it is more advantageous to use higher-intensity light sources such as halogen or incandescent lamps, since transmissive light modulators absorb much of the light.

A further option for configuring the invention makes provision to use a CRT or an LED array as an electronic image generator.

The image that is generated by the electronic image generator is projected by a lens onto the light-sensitive photoprint material. Normally the image generator and the light-sensitive material that form the object and image plane are parallel to each other, to ensure a sharp, undistorted image. Only those light rays are imaged which go through a small peripheral area of the lens. The optical axis of the lens is not used, as can be seen from FIG. 1. To utilize the optical axis of the lens, the lens must be placed aslant to the image plane. The electronic image generator is then so placed that the Scheimpflug condition is met, so that a sharp image is produced on the photoprint material. To maintain an undistorted image with this arrangement, the digital pattern must be pre-distorted so that the distortion is compensated by imaging with the lens.

This pre-distortion can be effected in such a way that the electronic image data are modified in a computer to create an appropriately pre-distorted image using the control device on the electronic image generator.

Correction of the distortion can also be effected optically, as is illustrated in FIG. 3. This is done by inserting an additional imaging optical system in front of the lens. This generates an appropriately pre-distorted intermediate image, so that when the next imaging is done, a reproduction of the pattern that is again undistorted is produced by the lens. Either a virtual or a real intermediate image can be generated on a ground-glass plate. Condensing lenses that are additionally brought into the light ray path enhance the brightness.

Another possibility to use the optical axis of the lens in projecting the digital image is to reflect the image, using a partially transmitting (half-silvered) mirror that is in the light ray path of the integrated (negative) projection system, onto the light-sensitive photoprint material.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
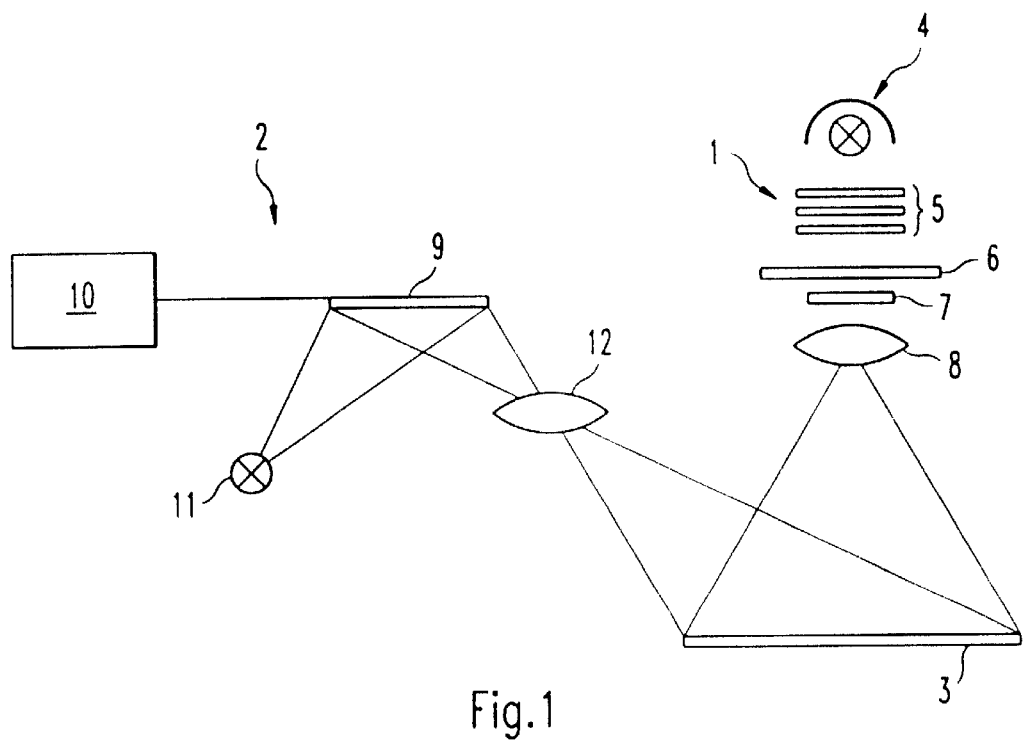
FIG. 1 is a schematic diagram of a first embodiment of a photographic printing device, according to the invention, with a DMD as reflective image generator.

The preferred embodiments of the present invention will now be described with reference to FIGS. 1–5 of the drawings. Identical elements in the various figures are designated with the same reference numerals.

The photographic printing device depicted in FIG. 1 for light-sensitive photoprint material has an integrated analog projection system 1, a digital projection system 2 and a support platform 3 for the photoprint material. With the integrated projection system 1, the light from a halogen lamp 4 is passed through color filters 5 and a scattering foil 6 onto a photographic negative 7. From the latter, the image is projected via a lens 8 onto the light-sensitive photoprint material disposed on the platform 3. With the digital projection system 2, the image is generated by applying electronic image data of the digital image pattern to a light modulator 9. This modulator is controlled by a control device 10 and illuminated by an LED light source 11. The image is then projected by a lens 12 onto the light-sensitive photoprint material, which is on the same support platform 3 onto which the negative image was also projected. In the arrangement depicted, the light modulator 9 is a reflecting display component such as a DMD. The image plane of the DMD 9, the principal plane of the lens 12 and the material support surface of the platform 3 are parallel to each other. In this configuration, only a small peripheral area of the lens 12 is used for the imaging.

Figure 4:
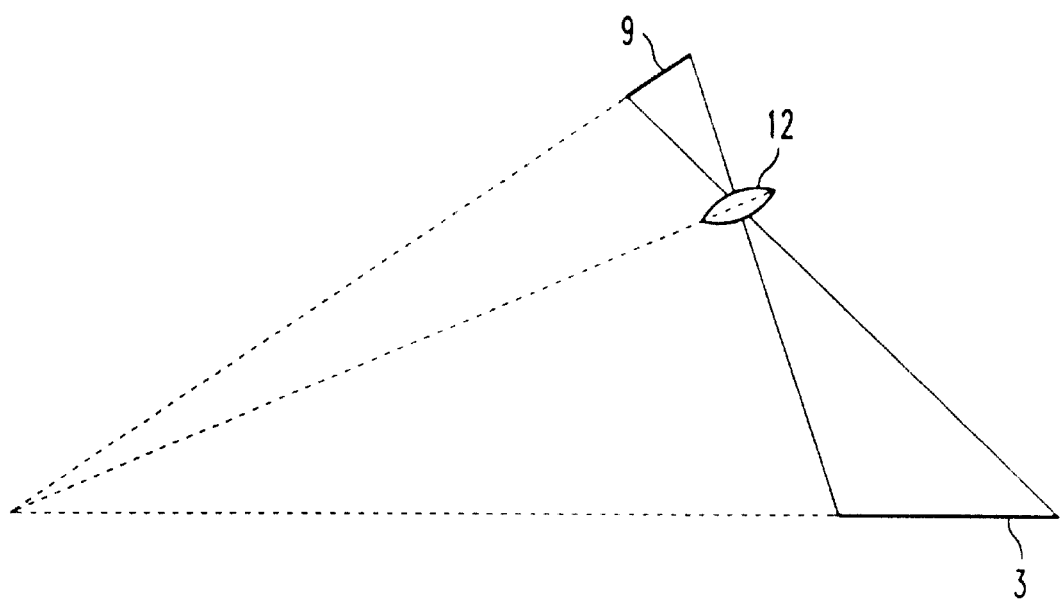
FIG. 4 is a schematic diagram of a third embodiment of a photographic printing device, according to the invention, wherein the digital projection system satisfies the Scheimpflug condition.

To use the optical axis of lens 12, the plane of the lens must be placed aslant to the platform 3 as shown in FIG. 4. The optical system must then be so arranged and aligned that the DMD, the lens and the platform 3 meet the Scheimpflug condition. Additionally, the digital image must generated on the DMD in pre-distorted fashion so that, while imaging through a lens placed at a slant, the image is reproduced on the photoprint material in undistorted form.

Figure 2:
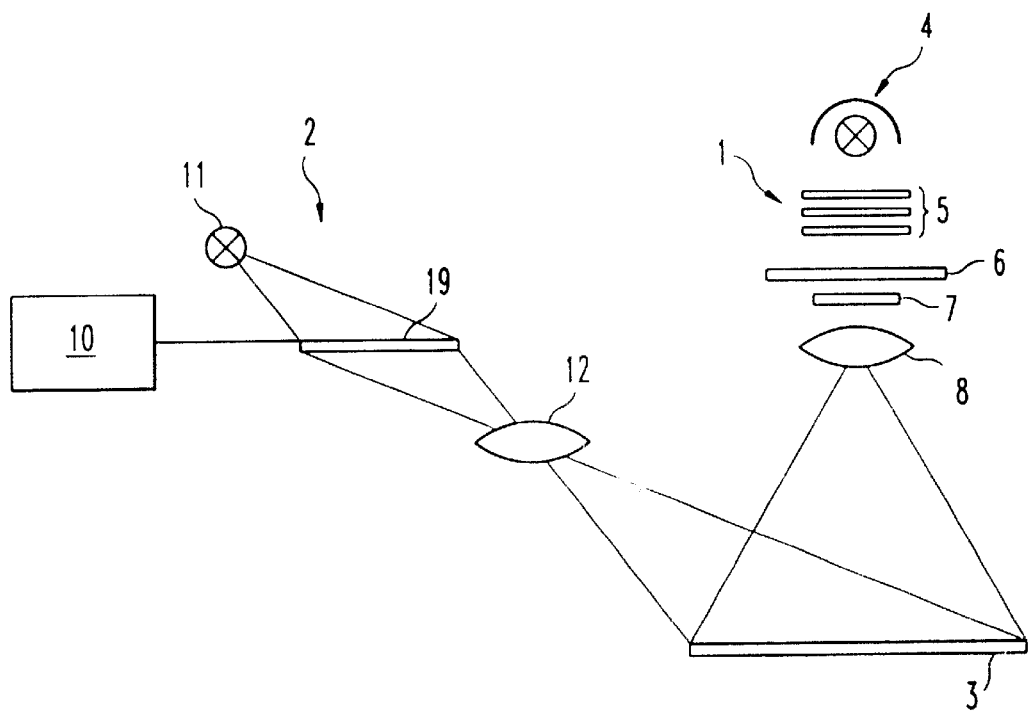
FIG. 2 is a schematic diagram of a second embodiment of a photographic printing device, according to the invention, with an LCD as a transmissive image generator.

FIG. 2 shows a projection system, according to the invention, wherein a transmissive display component 19 is provided as a controllable light modulator. This can, for example, be an LCD or a PLZT. The arrangements depicted in FIGS. 1 and 2 differ in the positioning and type of light sources for the light modulator. For illumination of a transmissive light modulator, a high-intensity light source such as a halogen lamp must be used, since in this case much of the light is lost in passing through the light modulator.

Figure 3:
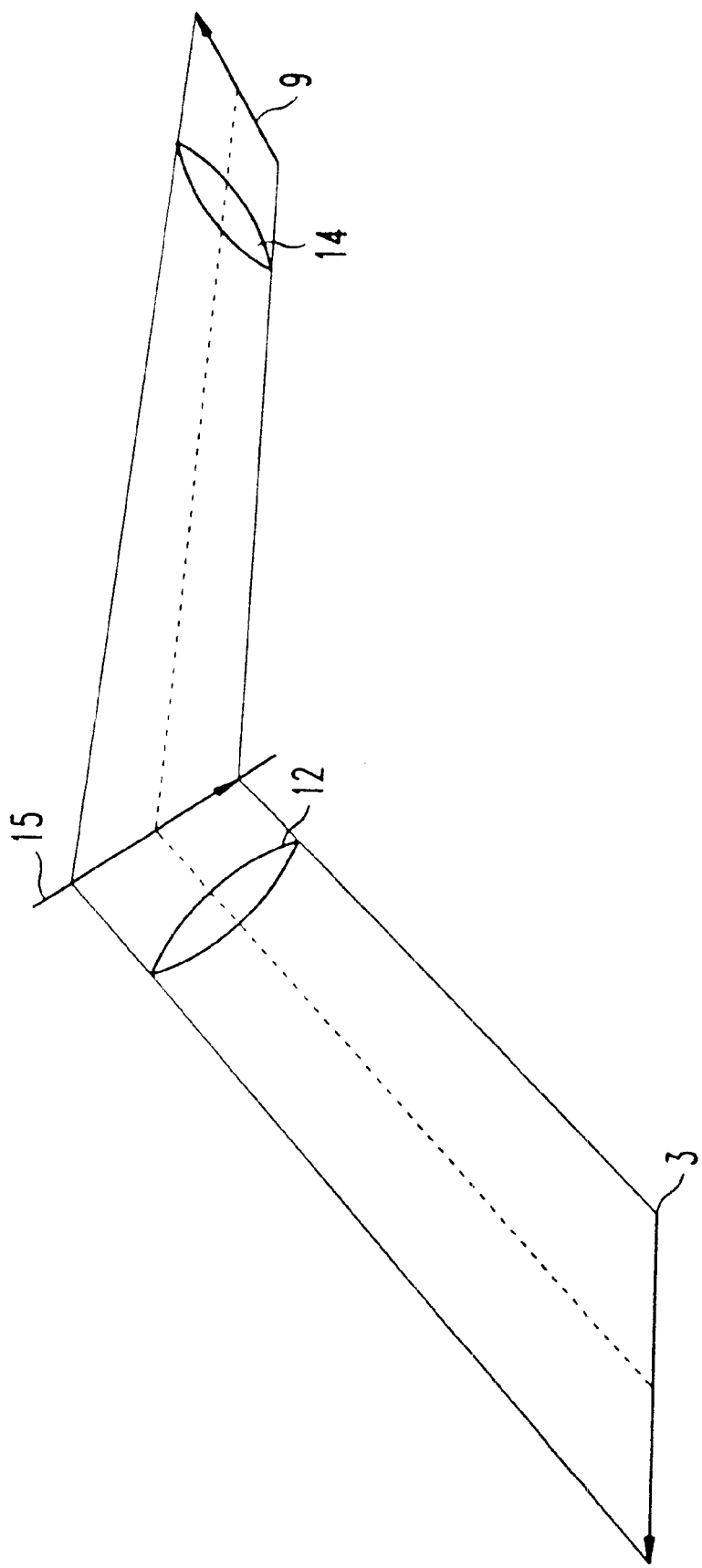
FIG. 3 shows the section of a light ray path that may be employed in the printing device of FIG. 1.

FIG. 3 shows an alternative section of a light ray path for the printing device of FIG. 1, with a pre-distorting imaging optical system positioned between the imaging lens 12 and the DMD 9. To generate pre-distortion, an additional lens 14 and a ground-glass plate 15 are provided. The image generated on the DMD 9 is distorted by the lens 14 as a real intermediate image on a ground-glass plate 15. The arrangement of the DMD 9, optical element 14 and ground-glass plate 15 has been selected so that the distortion of the intermediate image matches the reverse of the distortion by the following arrangement of ground-glass plate 15, optical element 12 and platform 3. The lens 12 then projects the intermediate image onto the photoprint material on platform 3 so that an undistorted version of the original electronically generated image is produced.

Figure 5:
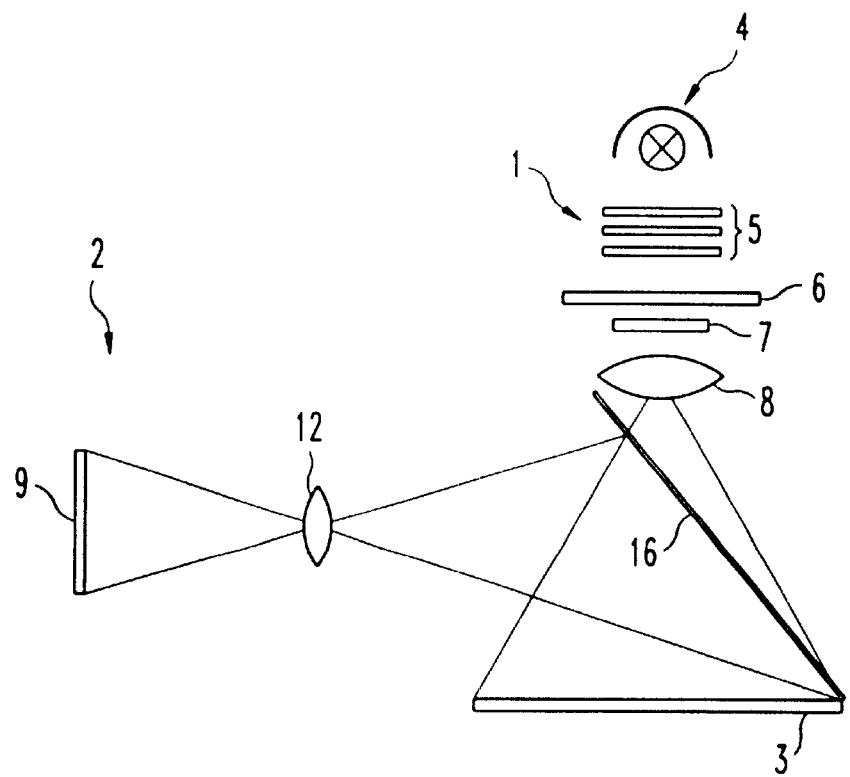
FIG. 5 is a schematic diagram of a fourth embodiment of a photographic printing device, according to the invention, wherein a half-silvered mirror is used to combine the respective,light ray paths of a digital and an analog projection system.

FIG. 5 illustrates still another embodiment wherein a partially transmitting (half-silvered) mirror is used to combine the respective light ray paths of the digital and analog projection systems. In this case, either a reflective or transmissive light modulator may be used, although a transmissive device is shown. The lens 12 projects the electronically generated image onto the photoprint material via the half-silvered mirror 16.

There has thus been shown and described a novel method and apparatus for printing photographs from developed film onto light-sensitive photoprint material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for imaging photographic negatives onto light-sensitive photoprint material, said apparatus comprising a platform defining an image plane for supporting the photoprint material during imaging; an analog image projection system, having a light source and a photographic negative holder, for projecting a negative image via a first light ray path onto the photoprint material while it is disposed on said platform, said first light ray path being perpendicular to said image plane; a digital image projection system, having an electronic image generator, for projecting an electronically generated image via a second light ray path onto the photoprint material while it is disposed on said platform, said second light ray path being non-perpendicular to said image plane; wherein the image generator is placed outside the first light ray path of the analog image projection system, wherein the projection systems are so constructed and disposed that the photoprint material disposed on said platform can receive images from both projection systems simultaneously, or one after the other, and wherein each said projection system is capable of projecting each of their respective images onto the same exact area of the said photoprint material while it is disposed on said platform, said images being either the same as or larger than the full size, and, if a change is made for the projection of images by one projection system to another, the two light ray paths remain unchanged.

2. The apparatus according to claim 1, wherein the electronic image generator of the digital image projection system includes a light source, a light modulator arranged to receive light from said light source, and a device for controlling the light modulator to selectively control the light emanating from the light modulator and to thereby form a desired image.

3. The apparatus according to claim 2, wherein the light modulator is a reflecting light modulator.

4. The apparatus according to claim 3, wherein the light modulator is a DMD.

5. The apparatus according to claim 2, wherein the light modulator is a transmissive light modulator.

6. The apparatus according to claim 5, wherein the light modulator is an LCD.

7. The apparatus according to claim 3, wherein the light source comprises LEDs.

8. The apparatus according to claim 5, wherein the light source comprises a halogen lamp with at least one color filter.

9. The apparatus according to claim 1, wherein the image generator of the digital image projection system is a CRT.

10. The apparatus according to claim 1, wherein the image generator of the digital image projection system is an LED.

11. The apparatus according to claim 1, wherein the digital image projection system further comprises a lens disposed in the second light ray path between the electronic image generator and light-sensitive photoprint material, such that the object plane is formed by the image generator and the image plane is formed by the photoprint material.

12. The apparatus according to claim 11, wherein the optical axis of the lens forms an angle with the image plane that does not equal 90° and wherein the orientation of the object plane meets the Scheimpflug condition.

13. The apparatus according to claim 11, wherein the electronic image generator of the digital image projection system includes a light source, a light modulator arranged to receive light from said light source, and a device for controlling the light modulator to selectively control the light emanating from the light modulator and to thereby form a desired image, and wherein the device for controlling the light modulator includes a computer which modifies a digital pattern so that a distorted image is generated on the light modulator, with the distortion so configured that in recording this image on the light-sensitive photoprint material, an undistorted reproduction of the image results.

14. The apparatus according to claim 12, further comprising an additional imaging optical system, disposed between the electronic image generator and the lens, which generates a pre-distorted intermediate image in such a way that in recording the intermediate image via the lens onto the light-sensitive photoprint material, an undistorted reproduction of the electronically generated image is produced.

15. The apparatus according to claim 14, wherein a virtual image is generated as the intermediate image.

16. The apparatus according to claim 14, further comprising a ground-glass plate disposed between the additional imaging optical system and the lens, on which a real image is generated as the intermediate image.

17. The apparatus according to claim 1, wherein a partially transmitting mirror is disposed in the first light ray path of the analog image projection system and said mirror reflects the image generated by the electronic image generator onto the light-sensitive photoprint material.

18. The apparatus according to claim 1, wherein the digital image projection system is capable of protecting the electronically generated image simultaneously with the projection of the analog image onto the photoprint material.

19. The apparatus according to claim 1, wherein the digital image projection system includes means for electronically scanning the analog image of a photographic negative and electronically modifying this scanned image.

20. The apparatus according to claim 1, wherein the digital image prolection system includes means for scanning several analog images of photographic negatives, electronically combining such scanned images and projecting the combined images onto the photoprint material before the analog images are projected thereon by the analog image projection system.

21. The apparatus according to claim 1, wherein a the digital image projection system includes means for electronically scanning several analog images of photographic negatives, electronically combining such scanned images and projecting the combined images onto the photoprint material after the analog images are projected thereon by the analog image projection system.

* * * * *